United States Patent [19]

Szendrödi et al.

[11] 4,416,435
[45] Nov. 22, 1983

[54] BAGGAGE-HANDLING SYSTEM FOR AIRPORTS

[75] Inventors: Valer Szendrödi; Karoly Gyurics, both of Budapest, Hungary

[73] Assignee: Ikarus Karosszeria es Jarmügyar, Budapest, Hungary

[21] Appl. No.: 450,756

[22] Filed: Dec. 17, 1982

Related U.S. Application Data

[63] Continuation of Ser. No. 183,928, Sep. 3, 1980, abandoned.

[30] Foreign Application Priority Data

Feb. 26, 1980 [DE] Fed. Rep. of Germany ....... 3007130

[51] Int. Cl.³ ............................ B64F 1/30; B64F 1/31; B64F 1/32
[52] U.S. Cl. ............................ 244/114 R; 244/137 P; 414/134; 104/88
[58] Field of Search ............ 244/118.1, 114 R, 137 R, 244/137 P; 414/398, 390, 572, 573, 134–136, 340–345, 391; 104/88, 27–31; 198/472, 321; 296/178

[56] References Cited

U.S. PATENT DOCUMENTS

| | | | |
|---|---|---|---|
| 2,053,969 | 9/1936 | Olds | 414/343 |
| 2,493,807 | 1/1950 | Fredrick | 198/472 |
| 3,019,047 | 1/1962 | Ahrens | 296/178 |
| 3,122,231 | 2/1964 | Pence et al. | 414/134 |
| 3,511,372 | 5/1970 | Kanfarian et al. | 414/134 |
| 3,556,441 | 1/1971 | Oberlander | 244/114 R |
| 3,561,623 | 2/1971 | McCaul | 414/134 |
| 3,610,159 | 10/1971 | Fickenscher | 414/136 |
| 3,695,462 | 10/1972 | Sullivan | 414/134 |
| 3,805,704 | 4/1974 | Schauffler | 244/137 R |
| 3,977,513 | 8/1976 | Rushforth | 104/88 |

FOREIGN PATENT DOCUMENTS 921163 1/1947 France ............................ 296/179

OTHER PUBLICATIONS

"Speaker Sortation Sys.", Brochure of Brookfield, Wis.
Am. Inst. of Astronautics and Aeronautics, vol. 11, #3, Mar. 1973, pp. 37–44.

Primary Examiner—Galen L. Barefoot
Attorney, Agent, or Firm—Karl F. Ross; Herbert Dubno

[57] ABSTRACT

A baggage-handling system, especially for airports, in which baggage is moved separately through the terminal from the passengers but generally in the same direction to and from the aircraft, the baggage route through the terminal structure being below the floor over which the passengers move. Between the terminal structure and the aircraft the passengers and baggage are transported by a vehicle which can be raised and lowered in a passenger compartment above a floor while the baggage is accommodated therebelow. According to the invention, in the terminal the baggage transportation system comprises a network of conveyors or tracks which have paths extending parallel to one another generally in the direction of passenger and baggage movement and transverse tracks or paths as well.

1 Claim, 7 Drawing Figures

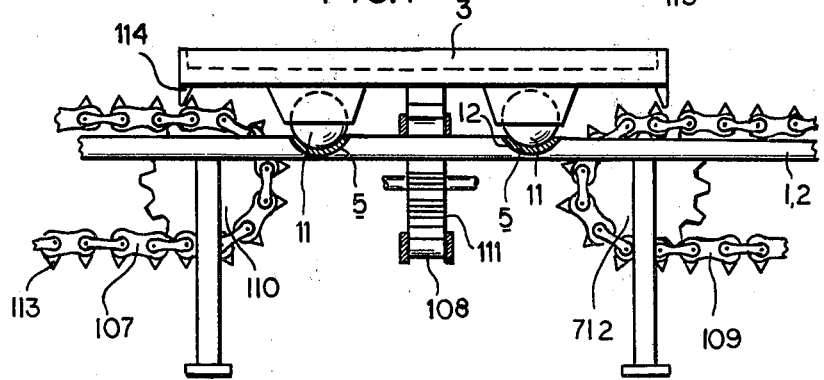

BAGGAGE-HANDLING SYSTEM FOR AIRPORTS

This application is a continuation of application Ser. No. 183,928 filed Sept. 3, 1980, now abandoned.

CROSS REFERENCE TO RELATED APPLICATION

This application is related to the commonly assigned copending application Ser. No. 107,660 filed Dec. 27, 1979, now U.S. Pat. No. 4,355,840, by two of the present joint inventors and dealing with airport management and especially a system for managing the flow of passengers and baggage between an airport terminal and an aircraft.

FIELD OF THE INVENTION

Our present invention relates to improvements in the system described in the aforementioned copending application and, more particularly, to a baggage-handling system for airports and like terminals in which baggage is moved to or from a vehicle from a center such as a terminal building.

BACKGROUND OF THE INVENTION

In airports and other terminals for processing passengers and their baggage, it has been proposed to provide a complex handling system as described in the aforementioned copending application which can increase the throughput of the terminal, i.e. the number of passengers and amount of baggage processed from a terminal building to aircraft or vice versa per unit of time, while enhancing safety and security.

For the security of the aircraft, the latter is parked at a location remote from the terminal building, at a location at which maintenance, repair, and disembarkation can be effected under complete control and without danger of untoward incident developing out of any action at the terminal structure. The aircraft is thus not moved between landing and the start of its taxing to takeoff, while all of the maintenance, fueling and boarding and deplaning operations are carried out with the aircaft at this fixed location.

In this system, the passengers are forwarded to the aircraft from the terminal building, or are moved from the aircraft to the terminal building, upon a vehicle, hereinafter referred to as the transport vehicle, together with their baggage.

In this system, the vehicle has an elevatable end which can be raised to the level of the aircraft door or lowered to an embarkation ramp at the terminal building so that the passengers can enter the vehicle while being completely sealed against access otherwise, while their baggage on pallets, is fed in the same direction into a baggage compartment beneath the floor of the transport vehicle.

The vehicle then travels to the aircraft and is raised so that an end of the passenger compartment of the vehicle registers with the open door to allow the passengers to move into the aircraft while the baggage is withdrawn from the underlying compartment and deposited in the hold or baggage compartments of the aircraft, preferably still upon the original pallets.

At the terminal building, passengers and their baggage are separated at the check-in station, with the baggage being placed upon pallets assigned to each passenger and moving through the terminal building along the route of the passenger who proceeds, after check-in, to a reception room to await arrival of or loading of the transport vehicle. The baggage pallets can travel along a conveyor path beneath the floor of the terminal hallways traversed by the passengers.

Thus, in spite of the fact that the passengers and the baggage move separately through the terminal building, they generally pass simultaneously and synchronously to and from the transport vehicle.

When the transport vehicle has an elevated end adapted to be raised to the level of the aircraft door, a set of steps can be formed to permit the passengers to climb to this level.

At the check-in station where travel documents are processed and any overweight is detected, a conveyor can be provided to deliver the pallets upon which the baggage is placed so that all the baggage of each passenger can be carried by a previously provided baggage carrier while the system as thus described and developed further in the above-identified application markedly increases the throughput of the airport and eliminates the need for complicated data processing installations for baggage identification, baggage recovery and baggage ticketing. The improvement is noticeable most significantly for embarking passengers and is less significant for deplaning passengers. In other words, the problem of recovery of baggage using the transport is still significant.

OBJECTS OF THE INVENTION

It is the principal object of the present invention to provide an improved baggage handling system for deplaning passengers at an aircraft whereby disadvantages of earlier systems are obviated.

Another object of the invention is to improve upon the system of the aforementioned copending application so as to increase the speed with which baggage is reunited with deplaning passengers.

It is yet another object of the invention to provide in the complex passenger and baggage managing system of the aforementioned copending application, a rapidly operating, easily monitored and flexible baggage-handling system facilitating both boarding of the aircraft or disembarkation.

SUMMARY OF THE INVENTION

These objects and others which will become more readily apparent hereinafter are attained, in accordance with the present invention, by a conveyor network for the boarding and deplaning of passengers and their baggage which is preferably used in the combination described in the aforementioned copending application but has utility even independently thereof.

According to the invention, a conveyor network comprises a plurality of parallel conveyors or tracks (transport tracks) extending in the direction of movement of baggage to and from the aircraft within the terminal building, at least one supply conveyor or track for empty baggage carriers (pallets) and at least one connecting conveyor or track (transverse track) for allowing transverse movement of the carriers across the first-mentioned array of conveyors. The empty carrier conveyor and the transverse conveyor extend perpendicular to the array of parallel conveyors.

On one side of the network, namely, the side at which baggage is transferred to the transport vehicle for delivery to the aircraft, the mutually parallel conveyors have free ends which can cooperate with the transport vehicle and/or other baggage-handling vehicles. On the opposite side of the network, each of the parallel conveyors advantageously runs beneath a floor, apron or cover plate which enables transfer of baggage thereover and facilitates accommodation of the empty-carrier conveyor below the floor level. The free ends are spaced above grade level, the vehicle traveling thereon.

The baggage-handling network of the present invention is thus of simple construction and is easily monitored. It can easily be erected in any large space within the passenger terminal and can be assembled readily from modular units so that any number of entry and exit paths (each having one of the mutually parallel conveyors of the array) can be provided. Obviously, the number of entry and exit paths will depend on the size of the airport terminal.

The conveyor network of the present invention thus can be flexibly accommodated in practically any terminal structure, e.g. in a simple hall, in a mezzanine or other vertically separated region of the building or in a specially provided building. The entry conveyors at the side turned away from the free ends thereof can be associated with respective check-in and document-examination stations.

For boarding, each passenger upon leaving the check-in counter or station, simply deposits his baggage upon en empty pallet or carrier and moves the same through the network. There is no need for intermediate storage of luggage since each incoming conveyor is capable of delivering the baggage to the corresponding transport vehicle directly without danger that the luggage will be checked unto a wrong flight.

The passenger can follow his luggage directly into the same transport vehicle to the aircraft and as the passenger transfers from the vehicle to the aircraft, his baggage is likewise transferred. The expense hitherto involved in accounting for and coordinating passengers with their baggage is eliminated.

Upon landing of the aircraft, the process operates in the inverse sense. The elongated bus-type transport vehicle with the incoming passengers and baggage withdrawn from the hold or the baggage compartment, arrive at the end of an exiting conveyor onto which the palletized baggage is placed for movement to the opposite side of the network. The passengers meanwhile proceed in a parallel way to customs or the baggage area exit.

When a customs check is required, the pallet or carrier can be fed by an appropriate track directly to this section. Empty carriers are recycled along the empty-carrier conveyor to the incoming conveyors.

The empty carriers thus can arrive at the incoming-passenger conveyors to receive new loads of luggage.

The connecting conveyor or conveyors which, like the empty-carrier conveyor run perpendicular to the array of luggage-transporting conveyors, serve to deliver baggage-filled carriers to, for example, intermediate conveyors of the array for temporary storage or to transfer the carriers with baggage thereon from the arriving conveyors to the incoming conveyors. In other words, baggage from a passenger in transit through the terminal can arrive from an aircraft, be placed upon one of the exiting conveyors and instead of passing through any customs or any other station to the end of this conveyor, can be diverted transversely to the conveyors for boarding passengers to permit delivery to the outgoing connecting flight.

Between the group of exiting conveyors and the group of entry conveyors, we prefer to provide a group of intermediate conveyors for temporary storage of baggage-filled carriers.

The exiting and entry regions can be separated from one another by simple partitions and each of these regions can serve, in the manner described in the aforementioned application, not only for movement of the passengers. Thus, above each or some of the transport conveyors, respective passenger ramps can be provided to allow the passengers to enter the transport vehicle directly. When the floor of the transport vehicle is above the floor of the terminal building, the passenger ramp may have a set of steps or other means for bringing the passenger to an upper level. The baggage conveyors can thus lie below the passenger ramp. Alternatively, the passenger ramp may be at floor level, in which case the baggage conveyor can descend below the passenger ramp as it approaches the vehicle station.

This ensures that movement of the passengers will not be encumbered by the conveyors and that, once the baggage is on the carriers, the passengers or other individuals will not have access to the baggage.

The term "conveyors" has been used herein in its broadest sense to refer to a path for the baggage. Preferably each path consists of a track formed by a pair of rails of upwardly concave cylindrical configuration in which ball casters or rollers of the baggage carrier are guided. Each baggage carrier can comprise an upwardly open tray or platform adapted to receive the luggage and provided at its bottom with four such rollers spaced corresponding to the spacing of the rails.

This permits self-travel of each carrier along the respective tracks, e.g. by providing an appropriate inclination or slope thereto. However, each track or each carrier may be provided with forced-propulsion means. For example, each carrier can also have a friction wheel and a motor which propels it along the track in the desired direction or the respective lengths of track can be provided with chain or other drive means which have entrainers engaging the carriers and moving them along the track. Pneumatic or other drive means can also be provided for this purpose. When forced propulsion means is provided on the tracks, it is desirable for each conveyor or track to be provided with a free end without such propulsion means at which one or more carriers can be temporarily stored or positioned to permit loading or unloading. Naturally, the chains or other forced-propulsion means can be reversibly driven so that the various tracks can be used selectively for incoming or outgoing passengers.

According to yet another feature of the invention, the transverse tracks intersect the transport tracks at right angles and have the same rail spacing so that when four rollers are provided equidistantly from the center of each carrier, the carrier can be shifted along one track until it reaches the intersection and then moved at right angles to its original direction without rotating the carrier. Naturally, if the transverse-track rail spacing is different from the rail spacing of the transport tracks, the spacing of the pairs of rollers of the carrier must be similarly modified.

BRIEF DESCRIPTION OF THE DRAWING

The above and other objects, features and advantages of the present invention will become more readily apparent from the following description, reference being made to the accompanying drawing in which:

FIG. 7 is a view similar to FIG. 6 but provided with means for displacing the carriers.

SPECIFIC DESCRIPTION

A full description of the general principles of the operation of the passenger and baggage-handling system can be found in the aforementioned copending application which is hereby incorporated in its entirety by reference as to all structural and operational details which are not specifically found in the instant description.

Figure 1:
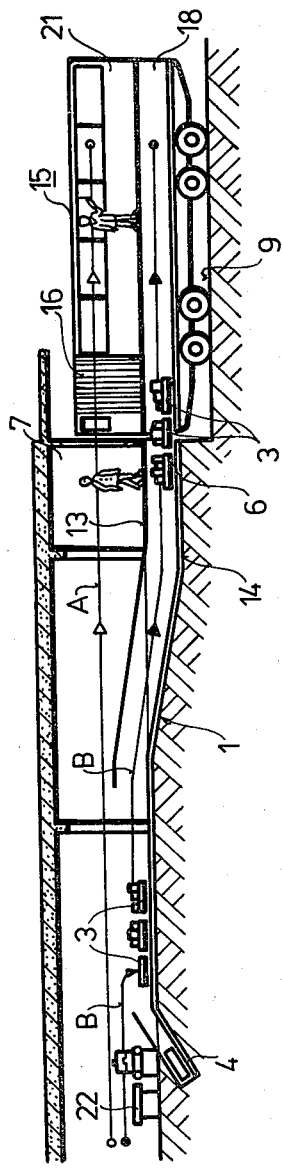
FIG. 1 is a vertical section, in highly diagrammatic form, showing the system of the invention during the period in which the baggage is transferred to the transport vehicle and the passengers board the latter for movement from the passenger terminal to the aircraft.
Figure 2:
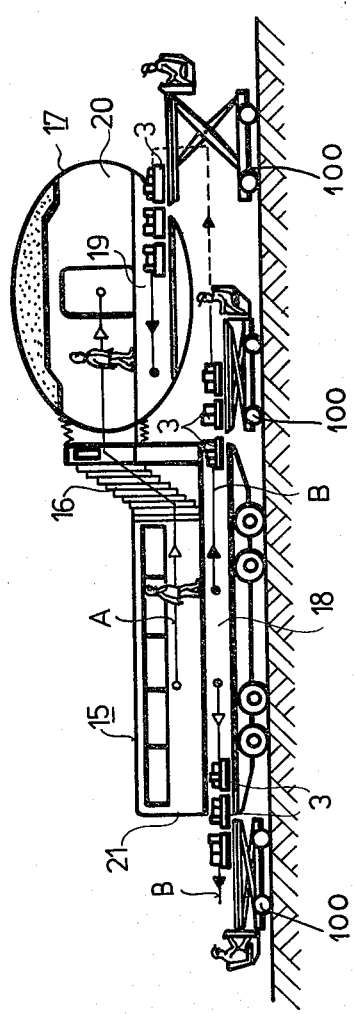
FIG. 2 is a similar view illustrating the operation of the system for boarding of the aircraft and loading of the luggage thereon.
Figure 3:
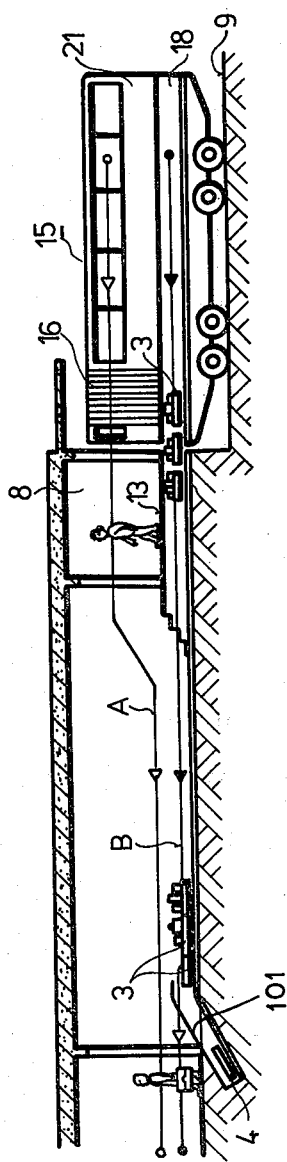
FIG. 3 is a similar view showing the handling of the baggage removed from an aircraft at the passenger terminal.

In FIGS. 1 through 3 which show the overall operations of the passenger and baggage-handling system, the arrows A represent movement of the passengers while movement of their luggage or baggage is represented by the arrows B.

From FIG. 1, therefore, it will be apparent that once the passenger and his luggage is subjected to the usual preflight inspection, document check and weight determination at a check-in station 22 (one of which can be provided for each of the boarding tracks 1 of the conveyor system to be described subsequently), the baggage is placed upon a baggage carrier 3 arriving on an empty-carrier conveyor 4 and then passes along the track 1. The passenger, thus separated from his baggage, proceeds parallel thereto, along appropriate ramps 7 or 8 better seen in FIGS. 4 and 5, above the path of the baggage to a reception chamber 7 to await boarding of the transport vehicle 15.

The empty carriers 3 pass directly beneath the processing stations 22 and are brought up, e.g. by forced conveyor means (see FIG. 7) so that the luggage can be placed thereon.

While the passengers may board the vehicle 15 from the reception room 7, the track 1 has a free end 6 disposed below this reception room so that the carriers can be transferred directly into an elongated luggage compartment 18 below the elongated passenger compartment 21 of the vehicle.

Upstream of the free end 6, a downward slope is provided for the track so that the latter can lie at a level 14 below the floor 13 of the passenger chamber 7. This level difference corresponds to the difference in heights of the baggage compartment 18 and the passenger compartment 21 at the entry side of the vehicle 15.

The vehicle 15 which has, at its entry side, a set of steps of adjustable height (compare FIGS. 1 and 2) is then driven to the waiting aircraft 17 where the steps 16 are elevated to the door of the passenger compartment 20 of the aircraft so that the passengers can step from the vehicle into the aircraft.

The baggage, on the other hand, is drawn out of the compartment 18 onto lift vehicles 100 for delivery to the hold 19 of the aircraft.

For the deplaning of passengers from an aircraft upon landing and taxiing to its maintenance station, the vehicle 15 is again brought to the aircraft and the steps 16 raised to the passenger door. Meanwhile, the carriers or pallets for the baggage in the hold of the plane are removed by lift trucks and placed in the compartment 18 of the vehicle which is boarded by the passengers.

The vehicle then travels to the passenger terminal (FIG. 3) in which reception chambers 8 are provided in a manner similar to that described for the chamber 7 in FIG. 1.

The passengers leave the vehicle, proceed through the chamber 8 parallel to their baggage 3 which is transferred onto exiting conveyors 2 to customs or other processing stations.

The baggage is removed from the carriers which pass onto the conveyor 4 below such stations for transfer to the check-in stations 22.

The empty-carrier conveyor 4 is disposed below grade so that baggage can readily be drawn over the apron 101 covering the downwardly extending stretches of the tracks 2.

Figure 4:
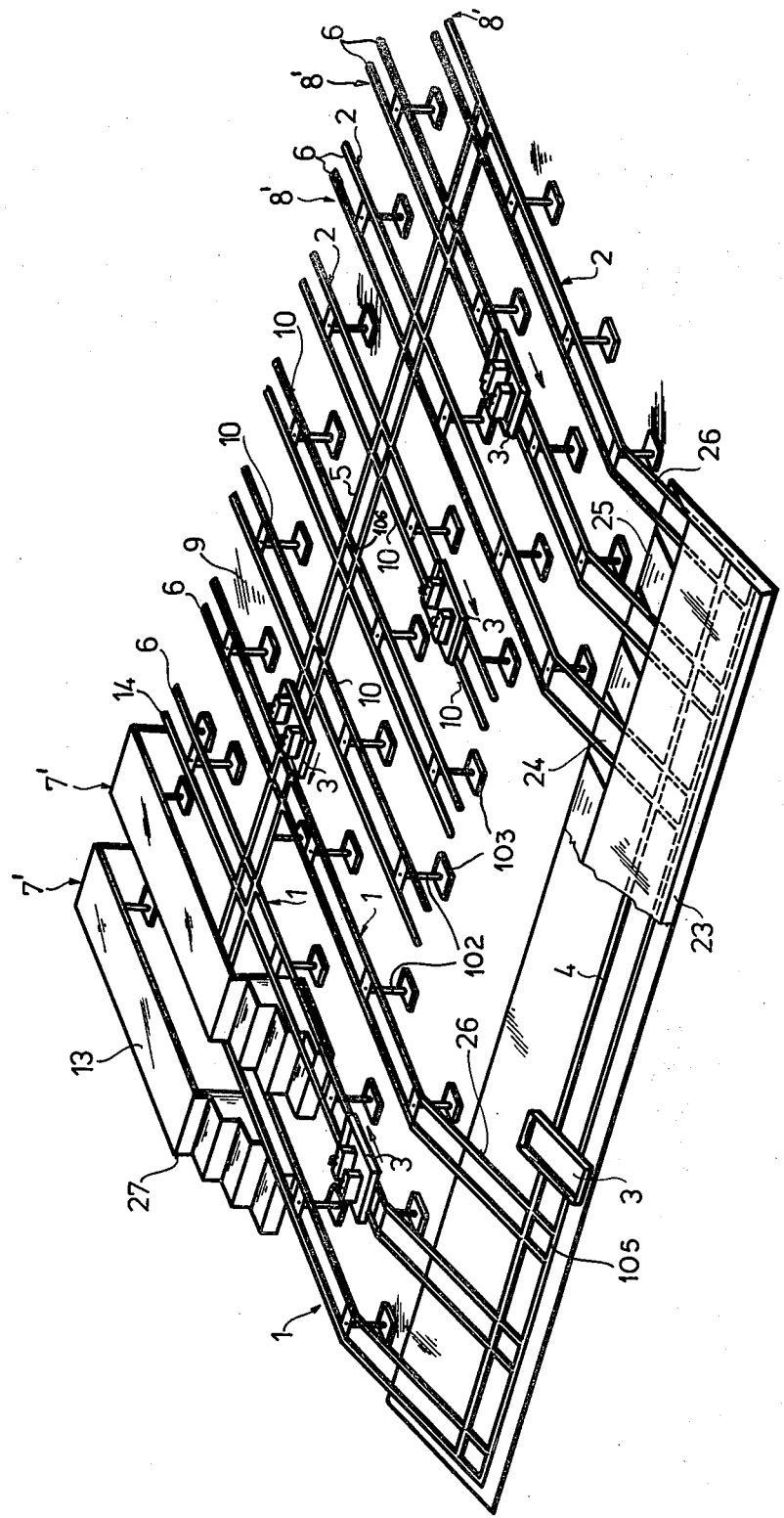
FIG. 4 is a perspective view of a closed conveyor or track network embodying the invention and adapted to be used in the handling of baggage for arriving and departing passengers.

The track system is shown diagrammatically and in perspective view in FIG. 4 and comprises two groups of three transport tracks or conveyors 1 and 2, respectively, serving boarding passengers and deplaning passengers. These tracks, of course, have the functions represented in FIGS. 1 and 3, respectively.

Between these two groups is a third group of tracks or conveyors 10 forming storage tracks for baggage in transit.

The tracks 1 and 2 terminate at their free ends 6 at a distance above the floor 9 which corresponds to the floor of the baggage-handling area. Adjacent each of these tracks or thereabove is a passenger ramp 7' which is provided with steps 27 to enable the passengers to reach this ramp from the floor 9. Similar ramps can be provided at 8' for the deplaning passengers.

The upper surfaces of the ramps 7' are represented at 13 and correspond to the floor of the reception chamber 7.

The ends of the tracks 1 and 2 opposite the chambers 7 and 8 terminate at the common transverse empty-carrier track 4 along which the carriers 3 are displaced from the deplaning side to the boarding side.

The latter conveyor or track is disposed beneath grade level, represented by the floor 9 upon which the entire track network is mounted on posts 102 via pedestals 103.

A housing 23 including the apron 101 previously mentioned, can be provided to accommodate the track 4 which is downwardly inclined away from the chambers 7 and 8.

At the boarding side and at the deplaning side the tracks 1 and 2, respectively, can pass through openings 24 in this housing a terminate in correspondingly downwardly inclined end sections 26.

Between conveyors or tracks, tread plates 25 can be provided to allow the passengers to easily walk past or over the housing 23. The latter can have removable covers for access openings enabling maintenance of the empty-carrier track.

Figure 5:
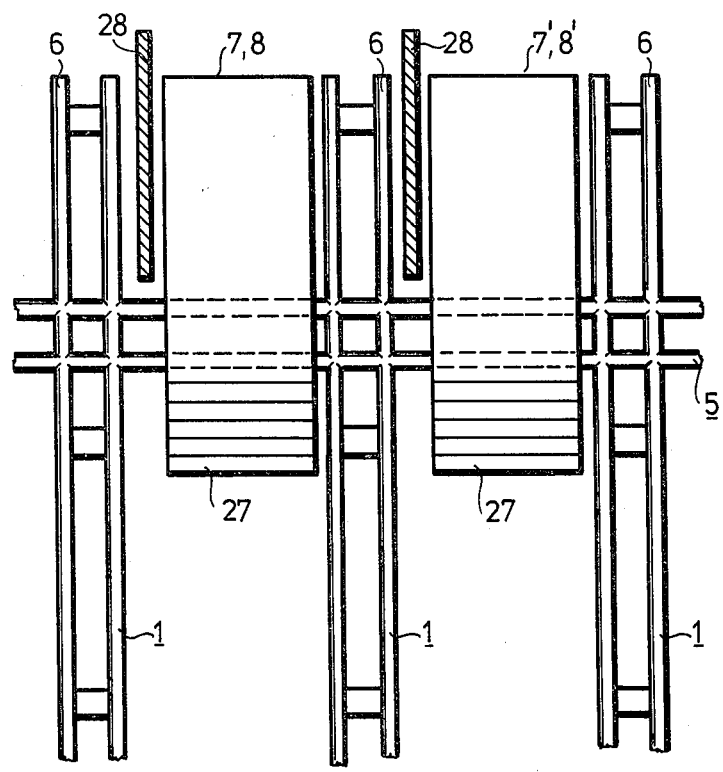
FIG. 5 is a detail view, partly in section and as seen from above, of a portion of network of FIG. 4.
Figure 6:
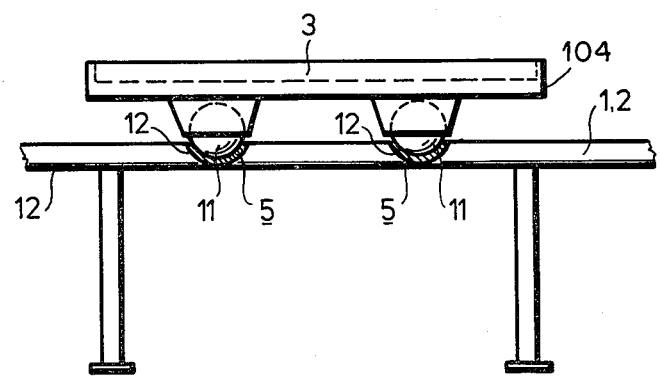
FIG. 6 is a side elevational view, partly in section, of a detail of the track and carrier.

Each of the tracks 1, 2, 4 and 10, previously described, and another transverse track 5 extending across the entire area of tracks 1, 2 and 10, comprises a corresponding pair of rails as shown clearly in FIGS. 5 and 6. Each of these rails 12 is an upwardly concave cylindrical segment receiving rollers 11 in the form of ball casters mounted on the underside of the tray 104 of the carrier 3. The ball casters 11 thus can rotate freely in all directions and, where the transverse tracks 4 and 5 have the same rail spacing as the tracks 1, 2 and 10, the ball casters 11 lie at the corners of a square so that the axial space is equal to that between the lateral wheel pairs.

At crossovers 105 and 106 between the transverse tracks and the transport tracks, therefore, the carrier 3 can be shifted at right angles to its previous direction without rotation.

It is also possible to make the axial spacing between the front and rear wheel pairs greater than that of the lateral wheel pairs and to correspondingly increase the width of the transverse conveyors over that of the transport conveyors.

Each of these conveyors or tracks can be provided with a given inclination or a section of downwardly sloping orientation for gravity movement of the carriers. Alternatively, a forced displacement device can be provided, e.g. in the form of sets of chains 107, 108, 109 passing over sprockets 110, 111 and 112 which can be reversibly driven and have entrainers 113 engageable with ledges or other projections 114 on the underside of the carrier tray 115 as shown in FIG. 7. Pneumatic displacement means can also be utilized and any conventional conveyor approach for displacement of the carriers may be used, at least for displacing the empty carriers therealong and raising the empty carriers above grade at the bearing stations.

The ramps 7' with their steps 27 should extend over the transverse conveyor 5 so that the transverse conveyor will not interfere with passenger movement.

The arrival and departure zones represented at 7 and 8 and by the ramps 7' and 8' can be separated by partitions 28 in the manner described.

Although FIG. 4 shows two groups of conveyors 1 and 2, each having three tracks, the number of tracks provided for boarding and deplaning passengers and the number of holding tracks 10 can be accommodated to the needs of the terminal and the usage of the airport. To facilitate this the track sections are provided in modular units which can be assembled in number according to the requirements.

Transit baggage can be shifted from one of the tracks 2 via the track 5 to one of the tracks 10 where such baggage can remain until it is retransferred to the track 5, then one of the tracks 1 and into the transport vehicle.

The track system can be assembled from detachable parts mounted on wheels, for example, so that unnecessary portions can be detached and put away but reattached whenever an increased travel is expected, e.g. for Olympic games, conventions, and the like.

In addition, the entire track system can be shipped by the manufacturer and assembled at the site particularly conveniently because of the detachability feature.

I claim:

1. A baggage-handling system for luggage at an airport having a plurality of check-in stations for boarding passengers, a plurality of reception areas spaced from said check-in stations in one direction for passengers awaiting embarkation upon an aircraft, and a plurality of arrival areas for deplaning passengers preparing to leave the terminal, said system comprising:

a plurality of first transport tracks extending from said check-in stations to said reception areas in said direction;

a plurality of second tracks extending away from said arrival areas, said first and second tracks being mutually spaced and parallel to one another and forming part of a track network;

a transverse track forming part of said network interconnecting all of said first and second tracks;

a multiplicity of baggage carriers shiftable along said tracks and adapted to receive baggage at said stations and carry said baggage to said reception areas and for carrying said baggage away from said arrival areas;

an empty-carrier track extending across all of said fist and second tracks for transporting empty carriers from said second tracks to said first tracks at said stations, said first and second tracks having free ends at said areas spaced above grade whereby a transport vehicle can travel on grade to said areas for receiving and discharging baggage-laden carriers for said first tracks and said second tracks, respectively, the reception and arrival areas each being formed with passenger ramps at a level above that of the perspective tracks and parallel thereto; and above grade a bus-type transport vehicle for receiving passengers from and delivering passengers to said ramps, said vehicle having a passenger compartment with a floor substantially in line with said ramps and a luggage compartment below said floor for receiving said carriers, said first and second tracks having other ends inclined downwardly away from said areas to said empty carrier track which is located below grade; and a housing receiving said other ends of said first and second tracks and said empty-carrier track, said housing having an inclined apron covering said empty-carrier track.

* * * * *